United States Patent [19]

Kmetz et al.

[11] 4,088,992

[45] May 9, 1978

[54] ELECTRO-OPTICAL DISPLAY DEVICE USING A LIQUID CRYSTAL CELL

[75] Inventors: Allan R. Kmetz, Nussbaumen, CH; Peter J. Wild, Wettingen, CH, both of Switzerland

[73] Assignee: BBC Brown, Boveri & Company, Limited, Baden, Switzerland

[21] Appl. No.: 681,824

[22] Filed: Apr. 30, 1976

[30] Foreign Application Priority Data

Jun. 27, 1975 Switzerland .................. 8376/75

[51] Int. Cl.² .......................... G02F 1/13; G09F 9/32
[52] U.S. Cl. .................. 340/336; 340/378 R; 340/380; 350/332; 350/356
[58] Field of Search .............. 340/336, 378 R, 380; 350/160 LC

[56] References Cited

U.S. PATENT DOCUMENTS

| 3,744,878 | 7/1973 | Kiemle et al. | 340/324 M |
| 3,838,908 | 10/1974 | Channin | 350/160 LC |
| 3,864,905 | 2/1975 | Richardson | 58/50 R |
| 3,879,723 | 4/1975 | Hornung | 350/160 LC |
| 3,882,490 | 5/1975 | Tashiro et al. | 350/160 LC |

Primary Examiner—David L. Trafton
Attorney, Agent, or Firm—Oblon, Fisher, Spivak, McClelland & Maier

[57] ABSTRACT

An electro-optical display device and a method of manufacturing it are disclosed. The display device includes a liquid crystal cell arranged between two polarizers. A light source is positioned adjacent one polarizer on the side thereof remote from the liquid crystal cell, and an electronic control device is coupled to the liquid crystal cell. A diaphragm is arranged on one side of the liquid crystal cell in the form of an aperture for limiting the display field of the liquid crystal. The device limits viewing parallax and improves contrast for both day and night viewing.

13 Claims, 6 Drawing Figures

ELECTRO-OPTICAL DISPLAY DEVICE USING A LIQUID CRYSTAL CELL

BACKGROUND OF THE INVENTION

1. Field of the Invention

The invention concerns an electro-optical display device, consisting of a liquid crystal cell (LC cell) arranged between two polarizers, a light source, arranged on the side of one polarizer remote from the LC cell, and an electronic control device. The invention further concerns a process for the manufacture of such display devices. 2. Description of the Prior Art Display devices of the kind above-mentioned are known. In daylight they are operated as reflection cells, the ambient light being employed as the light source. In darkness, on the other hand, these devices operate as transmission cells. In this case a light source arranged behind the second polarizer is employed for illumination.

In a few known devices, for local selective illumination of the signs or symbols to be displayed, a diaphragm is disposed between these symbols and the light source. In order to keep as small as possible the reading error (parallax), which results due to the distance between the local illumination device and the liquid crystal layer, the width of the aperture in the diaphragm must be chosen appropriately small.

SUMMARY OF THE INVENTION

It is one object of the present invention to provide a display device which makes possible a reading of displayed symbols with little parallax.

A further object of the invention is to provide dark symbols on a bright background by day and bright symbols on a dark background by night, whereby the energy required for internal illumination will be reduced to a minimum, and physiologically favorable reading conditions will be provided.

Yet another object of the invention is the provision of a method of producing an improved display device of the type described above.

Briefly, these and other objects are achieved in accordance with the present invention in that for local selective illumination of the range of symbols to be displayed, a diaphragm is arranged on the side of one of the two plates limiting the liquid crystal turned towards the liquid, and in that the form of the aperture of this diaphragm corresponds to the form of the respective symbol field.

In order to ensure good contrast between the displayed symbols, and their surroundings, the regions of the diaphragm which are opaque to the internal illumination must, when the display device is operating by reflection, exhibit about the same brightness as the remaining background of the symbols.

The method of manufacturing of the display device in accordance with the invention is characterized in that after the application of the electrode pattern, the opaque regions of the diaphragm are provided with an electrically insulating masking layer.

As compared with the application of the masking layer defining the diaphragm before the production of the electrode pattern, this has the advantage that the production of the conductive layer can be effected on a unitary substrate, and the etching of the electrode structure can be effected without taking heed of the characteristics of the diaphragm layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
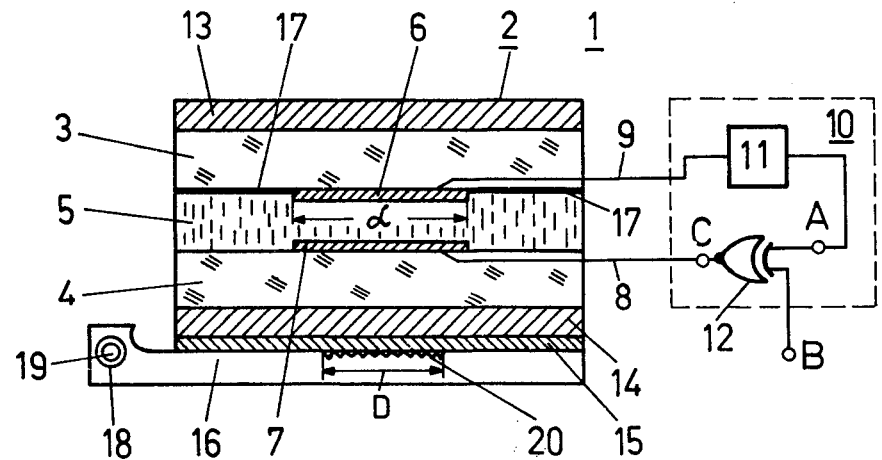
FIG. 1 is a sectional view through a display device with an electronic control device associated therewith.

Referring now to the drawings, wherein like reference numerals designate identical or corresponding parts throughout the serveral views, and more particularly to FIG. 1 thereof, there is shown a display device 1, that contains an LC cell 2, which consists of two glass plates 3 and 4 and a liquid crystal 5 arranged between these glass plates. As to the liquid crystal 5 this may be, for example, a nematic compound which possesses the capability of optical rotation, that is electrically controllable with the help of two electrodes 6 and 7 placed on the inner surfaces of the glass plates 3 and 4.

The electrodes 6 and 7 are transparent and consist of an electrically conductive material (for example, tin oxide), that is evaporated or otherwise applied upon the glass plates 3 and 4. They correspond in their form to the symbols which are to be displayed. The electrodes 6 and 7 are connected via respective electrical leads 8 and 9 with a control device 10, that in turn consists of a control stage 11 and an EXCLUSIVE-OR gate 12.

On the outer surfaces of each of the glass plates 3 and 4 are arranged polarizing foils 13 and 14 respectively. Abutting the polarizing foil 14 is arranged a semi-transparent reflector 15, to the outer surface of which there is attached a light distributor 16.

The regions of the inner surface of the glass plate 3 abutting the electrode 6 are provided with a mask opaque to the internal illumination, which therefore represents a diaphragm 17, of which the apertures exhibit the form of the symbols to be displayed. The mask consists, for example, of magnesium oxide or another substance that must on the one hand be electrically non-conducting and on the other hand exhibits a reflectivity of about the same brightness as the remaining background.

If, as shown in FIG. 1, the mask is applied to the inside of the upper glass plate 3, then in the covered regions of the display layer the surface orientation of the liquid crystal compound 5 has no importance. Only the symbol regions defined by the form of the electrode 6 have a function. Thus defects in orientation of the display background are absent as a reason for rejection. This advantage is also attained therethrough that, instead of the masking layer 17, a diaphragm is arranged between the polarizer 13 and the glass plate 3. In this case, however, reading errors appear once more owing to the parallax that is then present.

The light distributor 16 consists, for example, of a plexiglass plate, in a bore 18 of which is inserted an incandescent lamp (or light-emitting diode) 19. Since typical miniature incandescent lamps have a diameter of 1.5 mm, the incandescent lamp 19 is preferably arranged laterally of the LC display, so as not to make the overall thickness of the display and illumination too great (which is particularly important in the application of such display devices for wrist watches). The surfaces of the light distributor 16 turned away from the polarizer 14 are mirrored and serve as light reflectors.

In order to allow as much light as possible to appear in darkness (transmission operation) through the transparent electrode 6 and thus through the symbol region to be illuminated, the otherwise smooth plexiglass surface is roughened or provided with notches in the region 20 opposed to the electrode 6. The width D of the region 20 should correspond at most to the width d of the electrode 16. Since in this manner the light emerges from the light distributor only in the segment regions, a higher light intensity can be attained than with whole-area illumination.

Figure 2:
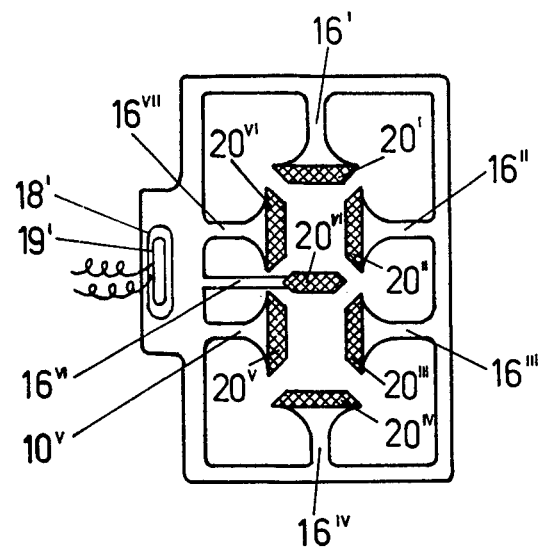
FIG. 2 is a plan view of a light distributor preferably employed as the light source for a display device with several symbol fields to be displayed.

In FIG. 2 is represented a plan view of another embodiment of a light distributor of a type which displays several symbol regions. The light emissive surfaces $20^I$, ... $20^{VII}$ are connected by individual light-guides $16^I$, ... $16^{VII}$ with the schematically indicated incandescent lamp $19^I$. The light-guides may be fibre-optic guides or injection moulded plastic elements. The ends of the light guides $16^I$, ... $16^{VII}$ are here identical with the light-emissive areas $20^I$, ... $20^{VII}$, which lie in a common plane below the LC display.

The advantage of the light distributor in accordance with FIGS. 1 and 2 as compared with the known devices (black diaphragm and uniform illumination) consists especially in the higher light intensity which can be attained in the local limited areas.

As the reflector 15, the reflector disclosed in Swiss patent application No. 8375/75 and corresponding U.S. application Ser. No. 689,251 is particularly suitable, which possesses a light scattering surface on the side turned towards the polarizer 14, that consists of a highly reflective thin metal layer (some 200 A), which is applied to a layer support provided with grooves. The semi-transparent mirror 15 can also be omitted. In this case the mirrored rear surface of the light distributor 16 serves as a reflector for daylight.

Figure 3A:
FIGS. 3a to 3c are timing diagrams showing the time relations in the electronic control device of FIG. 1 for day and night operation.
Figure 3B:
Figure 3C:

The mode of operation of the control device 10 is seen from the FIGS. 3a to 3c:

FIG. 3a shows the square-wave variation of voltage generated by the control stage 11 (for a clock display device this means a time-base circuit with following decoding and driver circuits), which appears at the input A of the EXCLUSIVE-OR gate 12 (FIG. 1). If a logical 'one' exists at the input B of this gate 12 (condition 1), then there results at the output C of the gate 12, and thus on the electrode 7, a pulse train (FIG. 3c) which exhibits a phase-shift of 180° as compared with the pulse train at the input A of the EXCLUSIVE-OR gate 12.

Provided that the voltage variation on the electrode 6 corresponds with that of FIG. 3a and provided the polarizers 13 and 14 are mutually crossed, the region of the symbol given by the form of the electrode 6 becomes dark when a voltage variation in accordance with FIG. 3c appears on the electrode 7.

If on the contrary a logical zero (condition 2) is present at input B of the EXCLUSIVE-OR gate 12, then there results at output C of the gate 12, and so on the electrode 7, a pulse train (FIG. 3b) which shows no phase shift with respect to the pulse train at input A of the EXCLUSIVE-OR gate 12.

Accordingly, in condition 1 dark symbols appear on a bright background (reflection operation in daytime). In darkness, on the contrary, condition 2 is provided, i.e. bright symbols on a dark background. The transition from condition 1 to condition 2 is brought about either by a push button or or by a photocell signal.

For wrist watch displays with incandescent lamps or light-emissive diodes as internal light sources a control button is built in because of the high power requirement. Here the control signal at input B of the EXCLUSIVE-OR gate may be derived from the same button.

If on the other hand there are used as light sources phosphor layers excited by radiation (uninterrupted illumination), then a photodiode is provided. If the ambient light differs from a definite value, then complementary control is effected.

Figure 4:
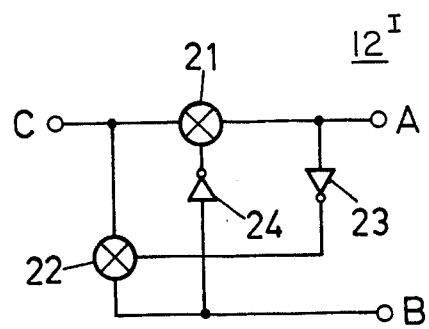
FIG. 4 is a further electronic control device for use with the display device of FIG. 1

In FIG. 4 there is represented a transmission gate circuit $12^I$, which is likewise suitable for phase control of the volatage on electrode 6. The two inputs are again designated by A and B and the output by C. In accordance with the control signal at input B (or 1) either the gate 21 or the gate 22 is opened. The elements 23 and 24 are logical inverter stages. The mode of operation of this transmission gate circuit $12^I$ is the same as explained above with reference to FIGS. 3a – 3c.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. An electro-optical display device, comprising:
    a liquid crystal cell including two transparent plates bounding a liquid crystal layer and arranged between first and second polarizers;
    a light source arranged on the side of one of the polarizers remote from said liquid crystal cell;
    an electronic control device, coupled to said liquid crystal cell; and,
    a diaphragm positioned on the side of one of the two plates of said liquid crystal cell which is adjacent to the liquid crystal layer, said diaphragm including an opening corresponding in form with the form of the desired symbol field of said liquid crystal cell for producing selective local illumination of said symbol field.

2. An electro-optical display device in accordance with claim 1 wherein:
    said light source consists of a light distributor coupled with at least one incandescent lamp.

3. An electro-optical display device in accordance with claim 1 wherein:
    said light source consists of a light distributor coupled with at least one light-emissive diode.

4. An electro-optical display device in accordance with claim 2 wherein:
    said light distributor consists of a transparent material havings its face roughened in the regions adjacent to which said symbol fields to be illuminated are situated.

5. An electro-optical display device in accordance with claim 4 wherein:

the width of said roughened region is no greater than the width of the corresponding display field.

6. An electro-optical display device in accordance with claim 4 further comprising:
a light reflective coating provided on the surface of said light distributor remote from said first polarizer.

7. An electro-optical display device in accordance with claim 2 further comprising:
a semi-transparent mirror positioned between said first polarizer and said light distributor.

8. An electro-optical display device in accordance with claim 7 further comprising:
a plurality of symbol fields to be displayed; and,
light guides having respective light exit surfaces of the same form as each of said symbol fields to be displayed arranged with all said light exit surfaces in a common plane at the rear of said semi-transparent mirror.

9. An electro-optical display device in accordance with claim 7 wherein:
said semi-transparent mirror includes on the side turned towards said first polarizer a light scattering surface that consists of a highly reflective thin metal layer which is applied to a supporting member provided with grooves.

10. An electro-optical display device in accordance with claim 9 wherein:
said supporting member is formed of glass and said reflective metal layer consists of a silver layer between 100–400 A thick.

11. An electro-optical display device in accordance with claim 1, wherein said electronic control device comprises:
an EXCLUSIVE-OR gate; and
means for supplying a pulse train and a logic control signal to said EXCLUSIVE-OR gate.

12. An electro-optical display device in accordance with claim 1, wherein said electronic control device comprises:
a pair of AND gates;
means for supplying a pulse train and the inverse of a control signal to one of said pair of AND gates; and
means for supplying the control signal and the inverse of the pulse train to the other of said pair of AND gates.

13. A method of manufacturing an electro-optical display device including a liquid crystal cell arranged between two polarizers and having a field limiting diaphragm on said liquid crystal cell, comprising the steps of:
applying an electrode pattern to said liquid crystal cell; and subsequently,
providing non-translucent regions of said diaphragm with an electrically insulating masking layer.

* * * * *